(12) United States Patent
Ballinger et al.

(10) Patent No.: US 10,088,103 B2
(45) Date of Patent: Oct. 2, 2018

(54) METHOD OF FABRICATING SPACE SATELLITE TANK COMPONENTS UTILIZING ADDITIVE MANUFACTURING AND SPIN FORMING

(71) Applicant: Keystone Engineering Company, Long Beach, CA (US)

(72) Inventors: Ian Ballinger, Anaheim Hills, CA (US); Wayne H. Tuttle, Torrance, CA (US)

(73) Assignee: Keystone Engineering Company, Long Beach, CA (US)

( * ) Notice: Subject to any disclaimer, the term of this patent is extended or adjusted under 35 U.S.C. 154(b) by 14 days.

(21) Appl. No.: 15/196,636

(22) Filed: Jun. 29, 2016

(65) Prior Publication Data

US 2017/0002978 A1   Jan. 5, 2017

Related U.S. Application Data

(60) Provisional application No. 62/187,414, filed on Jul. 1, 2015.

(51) Int. Cl.
*B21D 22/16* (2006.01)
*F17C 1/08* (2006.01)
(Continued)

(52) U.S. Cl.
CPC .............. *F17C 1/08* (2013.01); *B21D 22/16* (2013.01); *B21D 51/18* (2013.01); *B22F 3/1055* (2013.01); *B22F 7/08* (2013.01); *B23K 9/046* (2013.01); *B23K 9/048* (2013.01); *B23K 9/1093* (2013.01); *B23K 9/167* (2013.01); *B23K 15/0086* (2013.01); *B23K 26/342* (2015.10);
(Continued)

(58) Field of Classification Search
CPC ........ B21D 22/14; B21D 22/16; B21D 51/00; B21D 51/18; B21D 51/24; B33Y 10/00; F17C 2209/21; F17C 1/08; F17C 2203/012; B22F 7/062; B22F 7/08
See application file for complete search history.

(56) References Cited

U.S. PATENT DOCUMENTS 4,129,025 A * 12/1978 Carey .................... B21D 22/14
138/30
5,355,705 A * 10/1994 Schulze ................ B21D 22/16
72/81

(Continued)

OTHER PUBLICATIONS

Kannan Suresh Kumar, Todd E. Sparks, and Frank Liou, "Parameter Determination and Experimental Validation of a Wire Feed Additive Manufacturing Model", 2016 Annual International Solid Freeform Fabrication Symposium, pp. 1129-1153.

(Continued)

*Primary Examiner* — Edward Tolan
(74) *Attorney, Agent, or Firm* — Kinney & Lange, P.A.

(57) ABSTRACT

A method of forming a thick wall section on a specific region of a thin wall spinformed metallic tank shell includes forming a thin wall metallic tank shell blank by spinforming a metal sheet over a mandrel and removing the tank shell blank from the mandrel. The method further includes mounting the blank in an additive manufacturing system and adding metallic structural features to the tank shell according to a 3D model stored in memory in the additive manufacturing system.

6 Claims, 7 Drawing Sheets (51) Int. Cl.

| | | |
|---|---|---|
| *B22F 3/105* | (2006.01) | |
| *F17C 1/14* | (2006.01) | |
| *B22F 7/08* | (2006.01) | |
| *B23K 26/342* | (2014.01) | |
| *B23K 9/04* | (2006.01) | |
| *B23K 9/10* | (2006.01) | |
| *B23K 9/167* | (2006.01) | |
| *B23K 15/00* | (2006.01) | |
| *B21D 51/18* | (2006.01) | |
| *B33Y 10/00* | (2015.01) | |
| *B33Y 80/00* | (2015.01) | |
| *B22F 5/10* | (2006.01) | |
| *B22F 5/00* | (2006.01) | |
| *B23K 101/12* | (2006.01) | |
| *B23K 103/04* | (2006.01) | |
| *B23K 103/10* | (2006.01) | |
| *B23K 103/14* | (2006.01) | |

(52) U.S. Cl.
CPC .......... *F17C 1/14* (2013.01); *B22F 5/10* (2013.01); *B22F 2005/005* (2013.01); *B22F 2998/10* (2013.01); *B23K 2201/12* (2013.01); *B23K 2203/04* (2013.01); *B23K 2203/10* (2013.01); *B23K 2203/14* (2013.01); *B33Y 10/00* (2014.12); *B33Y 80/00* (2014.12); *F17C 2201/0128* (2013.01); *F17C 2203/012* (2013.01); *F17C 2203/0636* (2013.01); *F17C 2203/0639* (2013.01); *F17C 2203/0646* (2013.01); *F17C 2209/21* (2013.01); *F17C 2260/01* (2013.01); *F17C 2270/0186* (2013.01); *Y02P 10/295* (2015.11)

(56) References Cited

U.S. PATENT DOCUMENTS

| | | | |
|---|---|---|---|
| 8,561,283 B1* | 10/2013 | McCombs | B21D 22/16 123/195 C |
| 8,578,748 B2* | 11/2013 | Huskamp | B21D 22/02 72/10.4 |
| 9,764,423 B2* | 9/2017 | Hoebel | B23K 26/0093 |
| 2012/0291699 A1* | 11/2012 | Fonte | B21D 22/16 117/208 |
| 2015/0000108 A1* | 1/2015 | Hascoet | B23P 15/00 29/527.2 |
| 2015/0258610 A1* | 9/2015 | Villain-Chastre | B22F 3/1055 75/228 |
| 2015/0352618 A1* | 12/2015 | Schmidt | B21D 5/00 428/174 |

OTHER PUBLICATIONS

Webpage http://www.sicaky.com/additive-manufacturing/wire-am-vs-powder-am accessed Jun. 1, 2016.
Donghong Ding, Zengxi Pan, Dominic Cuiuri, and Huijun Li, "Wire-feed additive manufacturing of metal components: technologies, developments and future interests", International Journal of Advanced Manufacturing Technology, May 2015.
B. Dutta et al., "Additive Manufacturing by Direct Metal Deposition", Advanced Materials & Processes, May 2011, pp. 33-36.
Paul S. Griffin et al., "Design and Manufacture of Lightweight Fuel Tank Assembly", 39th AIAA Propulsion Conference, Jul. 21, 2003.

* cited by examiner

Fig. 10

METHOD OF FABRICATING SPACE SATELLITE TANK COMPONENTS UTILIZING ADDITIVE MANUFACTURING AND SPIN FORMING

CROSS-REFERENCE TO RELATED APPLICATION(S)

This application claims the benefit of U.S. Provisional Application No. 62/187,414 filed Jul. 1, 2015 for "Method of Fabricating Space Satellite Tank Components Utilizing Combinations of Additive Manufacturing and Spinforming" by I. Ballinger and W. Tuttle, which is hereby incorporated by reference in its entirety.

BACKGROUND

In the design and manufacture of satellite propellant and pressurant tank shells there are two main driving characteristics. These are weight and mounting configuration. The weight, or total mass of the finished item is controlled through the use of lightweight high-strength materials to minimize the thickness of the material while still meeting the operating pressure requirements. This generally drives the designs toward spherical tanks with thin membrane thicknesses or cylindrical tanks with hemispherical ends. These tanks are attached to the spacecraft structure such that the mechanical loads from the mass of the tank and its contents are transferred to the frame of the satellite. This requires that the attachment points are thicker than the nominal thickness of a tank that only must carry its low pressure loads.

In addition there is often the need to mount surface tension propellant management devices or other fluid expulsion devices such as bladders or bellows inside the tank. There also might be needs for local stiffening rings for stabilization of the pressure shell for vacuum conditions or high external buckling loads.

To solve this issue, designers typically provide thick section attachment points at selective locations such as at polar bosses, skirts at the circumference of the tank, or bosses attached to the sides of the tanks. These attachment features drive the initial material thickness of the raw materials from which the tanks are fabricated. To illustrate this consider a typical tank used for propellants of a GPS space satellite.

The raw material for the domes of such tanks are often forgings with sufficient thickness that an integral circumferential attachment ring can be machined from the parent material. The added thickness of the forging significantly increases the material cost. Additionally the increased material thickness significantly increases the fabrication cost as additional machining time and operations are required to remove the thicker material in the locations where it is not required. To reduce these inefficiencies, some designs utilize thinner domes welded to attachment rings fabricated from forgings, thereby reducing the total amount of material removal required, but increasing the fabrication costs and overall mass by producing and joining the welded ring to the tank components.

Another method of reducing the cost of manufacturing these tanks is the use of spinformed domes in lieu of forgings. The spinformed domes take advantage of the ability to spinform domes from thinner sheet metals, thereby reducing the amount of waste material at the "machine blank" stage, but the thinner sheet cannot generally accommodate the thicker attachment points except at the polar bosses. To generate the thickness required for attachment bosses, generally a thicker sheet is used and contours are machined in the part before spinforming, or a thinner sheet is locally reinforced through techniques such as inertia friction welding bar stock onto the sheet at the boss locations. But it is generally not possible to fabricate circumferential attachments on domes made from spinformed processes without adding welded attachment rings fabricated from forgings.

Therefore, there is a need for a method of fabricating space satellite tank components that is capable of producing physical and mechanical material characteristics in complex shapes with minimal excess material to be removed in subsequent machining operations.

SUMMARY

A method of forming a thick wall section on a specific region of a thin wall spinformed metallic tank shell includes forming a thin wall metallic tank shell blank by spinforming a metal sheet over a mandrel and removing the tank shell blank from the mandrel. The method further includes mounting the blank in an additive manufacturing system and adding metallic structural features to the tank shell according to a 3D model stored in memory in the additive manufacturing system.

In an embodiment a thin wall spinformed metallic tank shell includes a first region with a first thickness and at least one second region with a second thickness greater than the first thickness. The second region contains useful structural features formed by an additive manufacturing process.

DETAILED DESCRIPTION

One method to resolve the fabrication inefficiencies addressed above is the use of additive manufacturing (AM) to produce the tank components with reduced waste material. This is accomplished by molten metal deposition onto a substrate using techniques similar to welding, wherein material is additively applied layer by layer. An example method is the use of an electron beam welding system with a filler wire feeder to deposit weld metal onto a substrate and then continue to deposit weld metal until the complete part is fabricated. To achieve material quality and mechanical properties similar to plate or forged metals, the parts are protected from atmospheric reactions through the use of a vacuum environment. Additionally, the thermal management of the process has significant effects on the material's metallurgical structure and mechanical properties. Because the part is being created in a vacuum from molten metal, the entire part is subjected to significant exposure to high temperatures during the material deposition. Thermal expansion of the material being deposited causes the part size to vary during deposition. Thermal input to the process is provided from the electron beam and thermal output is provided through conduction into the previously deposited portion of the fabrication plus radiation, causing significant heat buildup during deposition. Thus, the part shape during fabrication is determined based on the final part sizing at its use temperature as well as the thermal buildup during fabrication. Depending on part size, configuration, and quality activities, it may be desirable to interrupt deposition periodically. During these interruptions the part's thermal condition and physical size changes, increasing the complexity of subsequent deposition activities. Similarly, the addition of local attachment features causes a change in the thermal profile of the part being fabricated and therefore the physical size and mechanical properties of the fabricated component.

The present invention is a method of fabricating space satellite tank components utilizing a combination of mandrel-based spinforming and additive manufacturing (AM). Initially the part (a dome is used for illustrative purposes, although other components such as cylinders are shown to be equally applicable to the process described) is produced from thin sheet metal. Unlike prior art, the locations of polar bosses or other tank attachment features are not required to be at final part thickness. Instead the thickness at these locations is driven by fabrication convenience and best shop practices.

After the part is spinformed the thickness of attachment locations are locally increased through additive manufacturing techniques. These may include, but are not limited to laser consolidation of powdered metal, and addition of wire utilizing conventional weld metal buildup processes such as gas tungsten arc, plasma arc, laser beam, electron beam, and others known in the art. The spinforming process provides a surface that can mate to thermal control tooling (heat sink devices, for example) to minimize thermal distortion of the dome during the additive manufacturing activities. This eliminates the negative thermal effects to the base material, or substrate (material at the location of instantaneous additive manufacturing processing). Examples of the work would include buildup of polar bosses on tanks and creation of mounting tabs and circumferential mounting features.

The process can also be used to generate features on the interior surfaces of spinformed domes for the purpose of mounting or supporting internal components such as propellant management devices (PMD), or for structural purposes such as reinforcement ribs. Mandrel-based spinforming does not typically allow the generation of raised features on the part's interior surface since the inner mold line of the part is in intimate contact with the outer surface of the mandrel during forming operations. Removal of the formed part from the mandrel at the conclusion of spinforming necessitates that the mandrel not create concavities or locally convex internal features. Utilizing additive manufacturing to build up features on the interior of spinformed tank components enables the use of thin spinformed domes without the need for complex milling of interior cavities from thicker materials.

Similar to the illustration using domes provided above, it will be apparent to one skilled in the art that parts of cylindrical, conical, or other shapes can be fabricated on internal mandrels and subsequently have internal and external features applied through additive manufacturing.

Figure 1:
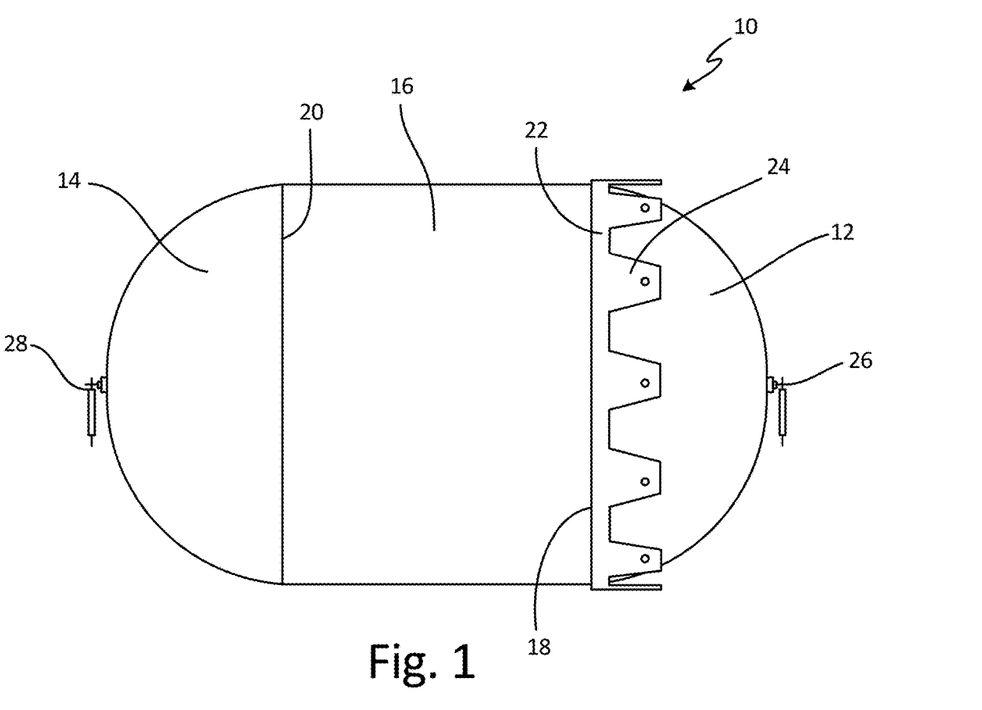
FIG. 1 is a schematic illustration of a propellant tank.

An example of a space satellite propellant tank is shown in FIG. 1. Tank 10 comprises domes 12 and 14 separated by cylindrical section 16 joined to domes 12 and 14 by circumferential welds 18 and 20 respectively. Skirt 22 is attached to tank 10 and contains tabs 24 for securing the tank to the frame of the satellite. Fixtures 26 and 28 provide propellant ingress and outlet respectively to the system. According to the invention, individual tabs 24 may be formed by additive manufacturing on tank 10 thereby eliminating the weight of skirt 22.

Three general classes of additive manufacturing for depositing metal on a substrate are powder based layer by layer, powder based direct metal deposition, and wire based direct metal deposition. Powder based layer by layer fabrication of metal structures is not suitable for forming individual metallic structures on the uneven surfaces encountered on internal and external satellite tank features. Powder based and wire based direct metal deposition of metallic structural features are suitable processes for the present invention. In both processes, metal is fed to a localized molten pool on a substrate created by a focused energy beam traversing the substrate. As the molten pool solidifies the added metal forms a three dimensional structure according to a computer model stored in the memory of the direct metal deposition system. Closed loop feedback control systems managing the energy beam, traverse rate, metal feed rate, atmosphere control, and other parameters known in the art allow fully dense additively manufactured near net shapes of a wide variety of alloys.

Figure 2:
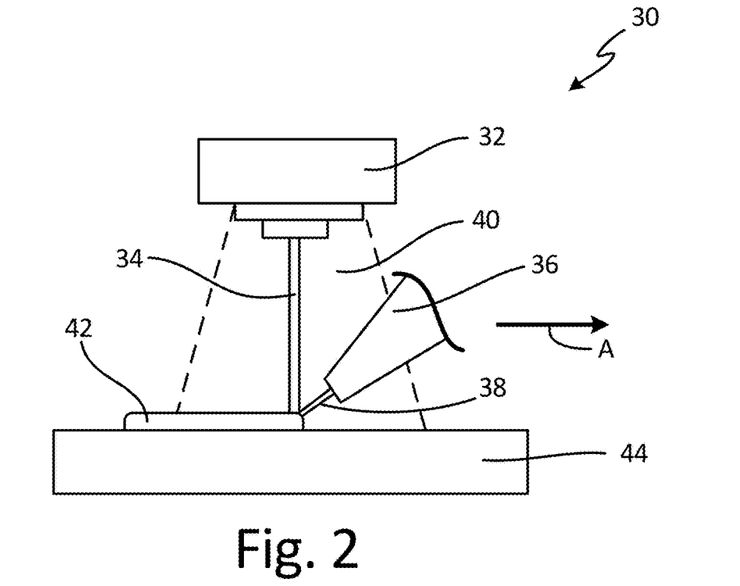
FIG. 2 is a schematic illustration of a wire feed laser deposition direct metal deposition process.

An exemplary wire feed additive manufacturing (AM) system is shown in FIG. 2. Wire feed AM system 30 comprises high powered layer system 32, laser beam 34, wire feed system 36, wire 38, shielding gas cloud 40, deposit 42, and substrate 44. Laser system 32, wire feed system 36 and gas cloud 40 are indicated moving in the direction of arrow A during a build. Although both powder feed and wire feed direct metal composite systems can form the structural features of the invention on tank components, a wire feed system is preferable for the present invention.

Figure 3:
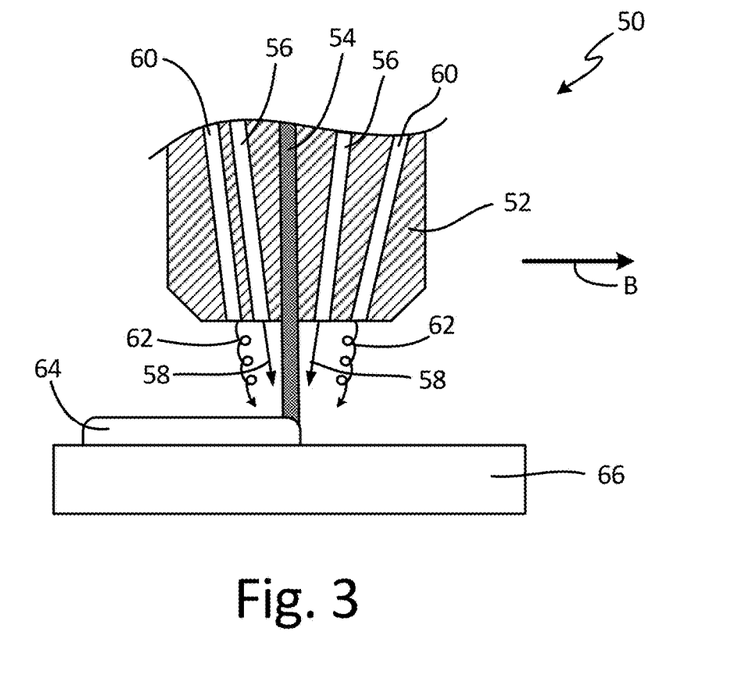
FIG. 3 is a schematic illustration of a powder based direct metal deposition process.

A schematic representation of an exemplary powder based direct metal deposition additive manufacturing system is shown in FIG. 3. Powder based laser deposition system 50 comprises nozzle 52, high power laser beam 54, powder feed channels 56, powder 58, shielding gas channels 60, shielding gas 62, direct metal deposit 64, and substrate 66. Nozzle 52 containing laser beam 54, powder feed channels 56, and shielding gas channels 60 is indicated moving in the direction of arrow B during a build. Examples of powder based direct metal deposition known in the art include at least laser engineered net shaping (LENS), direct metal laser sintering (DMLS), selected laser melting (SLM), laser powder injection, and direct metal deposition (DMD). Examples of wire based direct metal deposition known in the art include at least wire feed laser deposition, electron beam additive manufacturing (EBAM), hot wire gas tungsten arc melting (HW-GTAW), and ion fusion formation (IFF).

Figure 4:
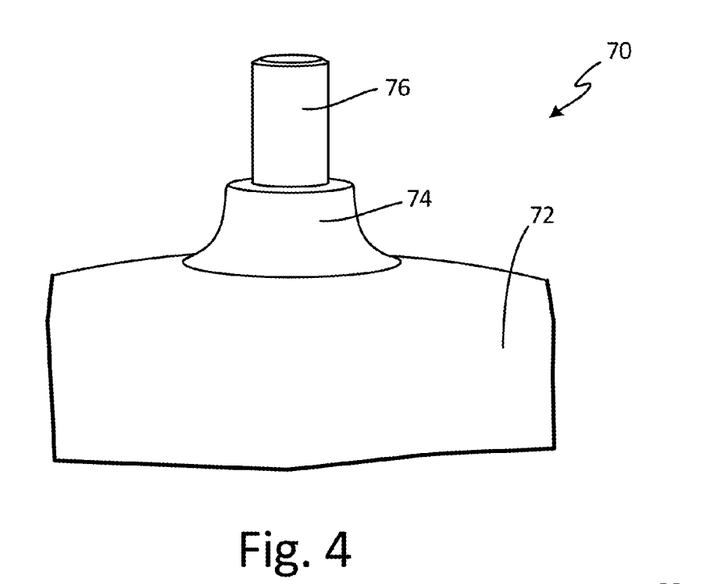
FIG. 4 is a schematic illustration of a polar boss formed on a spinformed tank shell.

An example of a structural feature added to a spinformed satellite tank shell is shown in FIG. 4. The feature is a polar boss formed on a spherical section of a tank. Polar boss feature 70 comprises tank shell 72, transition region 74, and boss (or locating pin) 76. Prior art methods of forming polar boss 70 would be to remove materials surrounding the feature by machining an initial casting or forging (i.e. subtractive manufacture). Cost and material savings are substantial.

Figure 5:
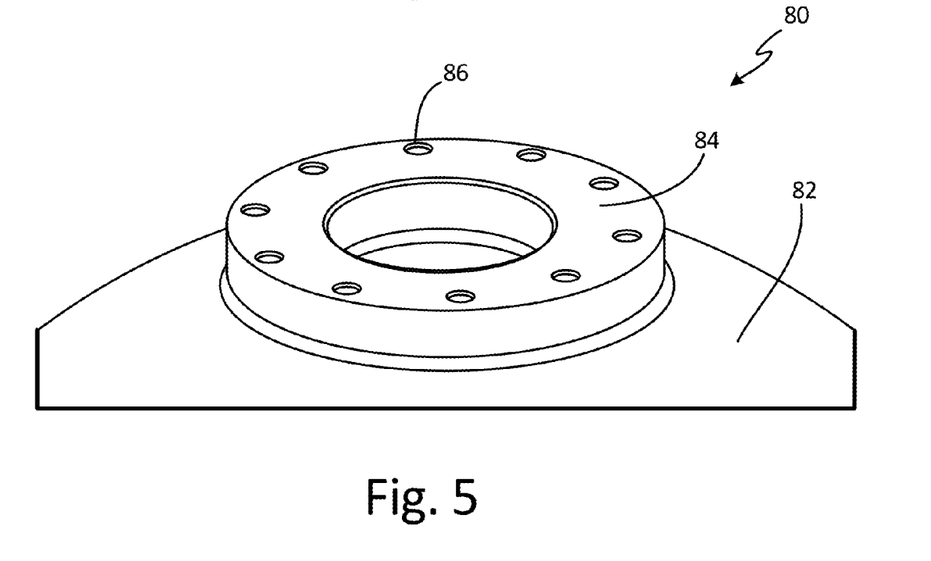
FIG. 5 is a schematic illustration of a mounting ring formed on a spinformed tank shell.

Another example of a structural feature added to a spin-formed satellite tank is the mounting ring shown in FIG. 5. According to the invention, the ring can be formed in place by additive manufacturing. Mounting ring feature 80 comprises tank shell 82, mounting ring 84, and threaded holes 86 for attaching external features to tank shell 82. Cost and material savings by not having to machine mounting ring 80 from a casting or forging blank are substantial.

Figure 6:
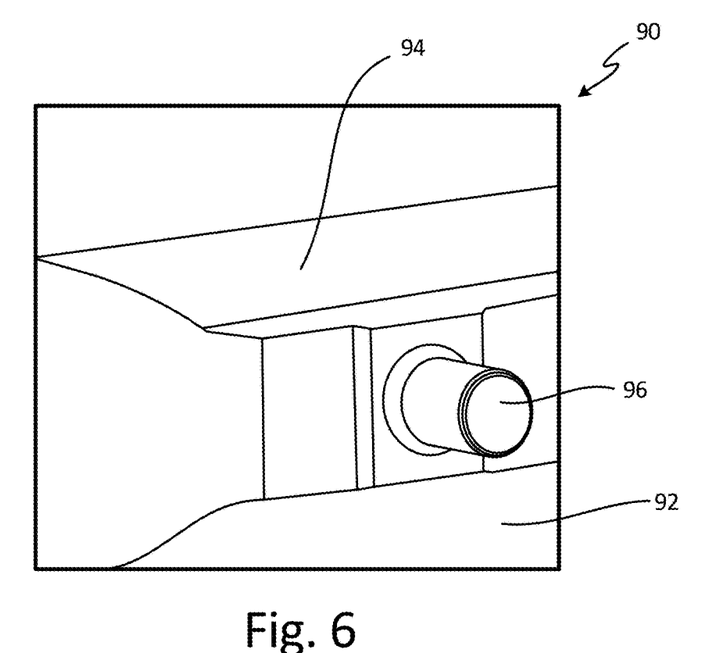
FIG. 6 is a schematic illustration of a trunnion formed on a spinformed tank shell.

A third example of an external structural feature added to a spinformed satellite tank shell is a trunnion for supporting the tank shell shown in FIG. 6. Trunnion feature 90, preferably formed by additive manufacturing, comprises spinformed tank shell 92, boss 94, and pin 96. Cost and material savings by forming trunnion 90 by additive manufacturing instead of machining the feature from an initial casting or forging blank are substantial.

Figure 7:
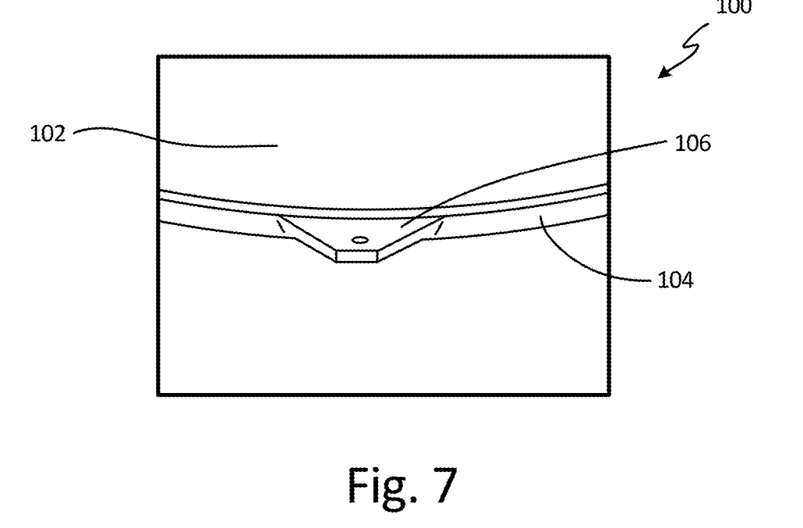
FIG. 7 is a schematic illustration of a mounting tab formed on a spinformed tank shell.

A fourth example of an external structural feature added to a spinformed satellite tank shell by additive manufacturing is shown in FIG. 7. FIG. 7 shows mounting tab feature 100 comprising spinformed tank shell 102, circumferential rib 104, and mounting tab 106. The cost and material savings due to forming circumferential rib 104 and mounting tab 106 by additive manufacturing instead of machining the feature from a blank forging or casting are substantial.

Figure 8A:
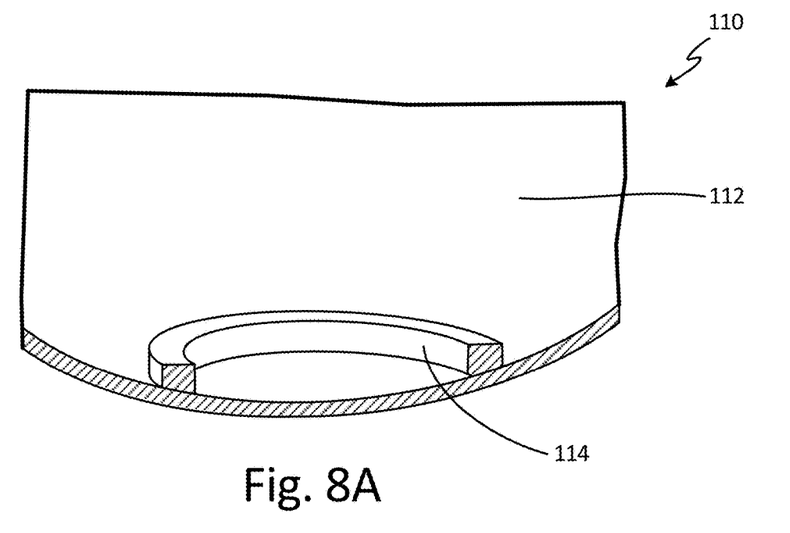
FIG. 8A is a schematic illustration of a mounting support formed on the interior of a spinformed tank shell.
Figure 8B:
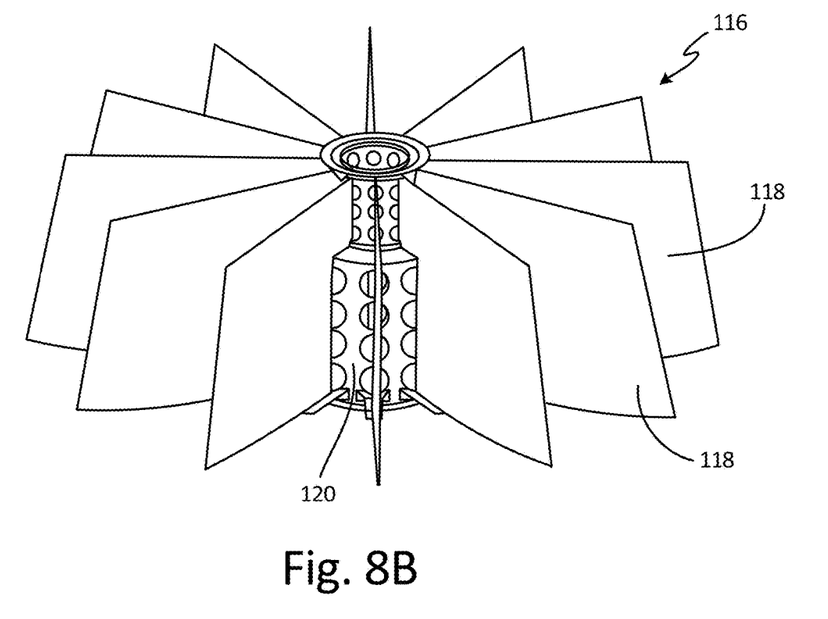
FIG. 8B is a propellant management device that can mount on the support in FIG. 8A.

An example of an internal structural feature added to a spinformed satellite tank shell by additive manufacturing is shown in FIG. 8A. Propellant management device (PMD) mounting feature 110 comprises tank shell 112 and mounting ring 114. An exemplary PMD is shown in FIG. 8B. PMD 116 comprises vanes 118 attached to sump feature 120 for collecting propellant and directing it to a drain under sump 120. PMD 116 may be mounted on mounting ring 114 by securing the bottom of sump 120 to mounting ring 114.

Figure 9:
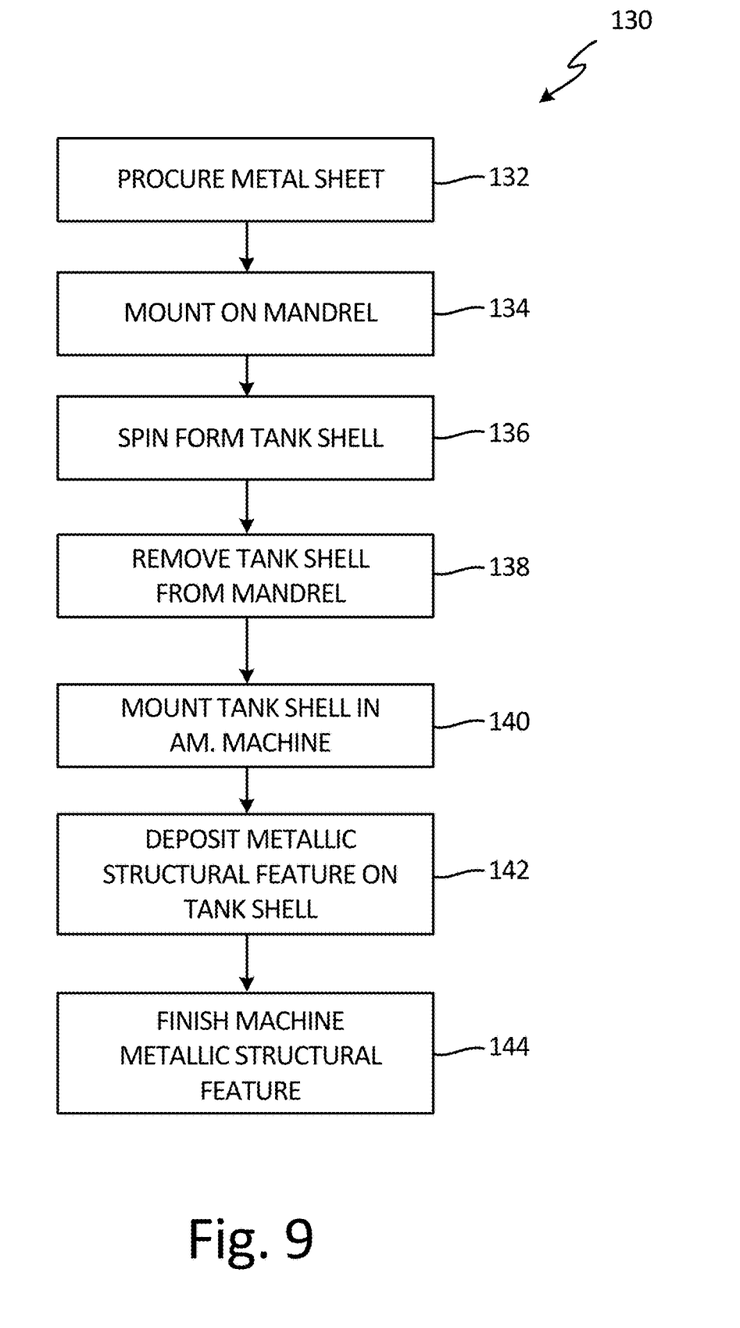
FIG. 9 is a diagram showing the fabrication steps of metallic structural features added to spinformed tank shells by additive manufacturing.

Method 130 of forming structural features on thin wall metallic satellite tank shells is shown in FIG. 9. The first step is to procure metal sheet (step 132). Satellite tank shells may be aluminum, titanium, steel, and alloys thereof. In an embodiment, the tank shells may be 6061, 2219, and 2014 aluminum alloys and CPTi, Ti-6Al-4V, Ti-15V-3Cr-3Sn-3Al titanium alloys. Initial thickness of the metal sheet may be from 0.125 in. (0.318 cm) to 2 in. (5.08 cm). The metal sheet may be mounted on a mandrel to initiate spinforming (step 134). The sheet may then be spinformed to form a tank shell typically at an elevated temperature (step 136). The spinformed tank shell may then be removed from the mandrel and the outer surface is stripped using machining or abrasive removal methods (step 138). The tank shell may then be mounted in an additive manufacturing (AM) system in preparation for deposition of metallic structural features on the spinformed tank shell (step 140). Preferable AM processes for adding structural features to the tank shell may be powder based and wire based direct metal deposition. Powder based direct metal deposition systems for the present invention include, but are not limited to, laser engineered net shaping (LENS), direct metal laser sintering (DMLS), selected laser melting (SLM), laser powder injection, and direct metal deposition (DMD). Wire based direct metal deposition systems for the present invention include, but are not limited to, wire feed laser deposition, electron beam additive manufacturing (EBAM), hot wire gas tungsten arc welding (HW-GTAW), and ion fusion formation (IFF). A preferred direct metal deposition process for the present invention is wire feed laser deposition. In the next step, the metallic structural feature is deposited on the tank shell wall (step 142). As discussed above, metallic structural features of the invention include, but are not limited to, polar bosses, mounting rings, trunnions, mounting tabs, and others known and not known in the art. In the present invention, the structural features may be added to the outside and inside of the tank shell. In the last step, the metallic features are machined to final dimensions (step 144).

Figure 10:
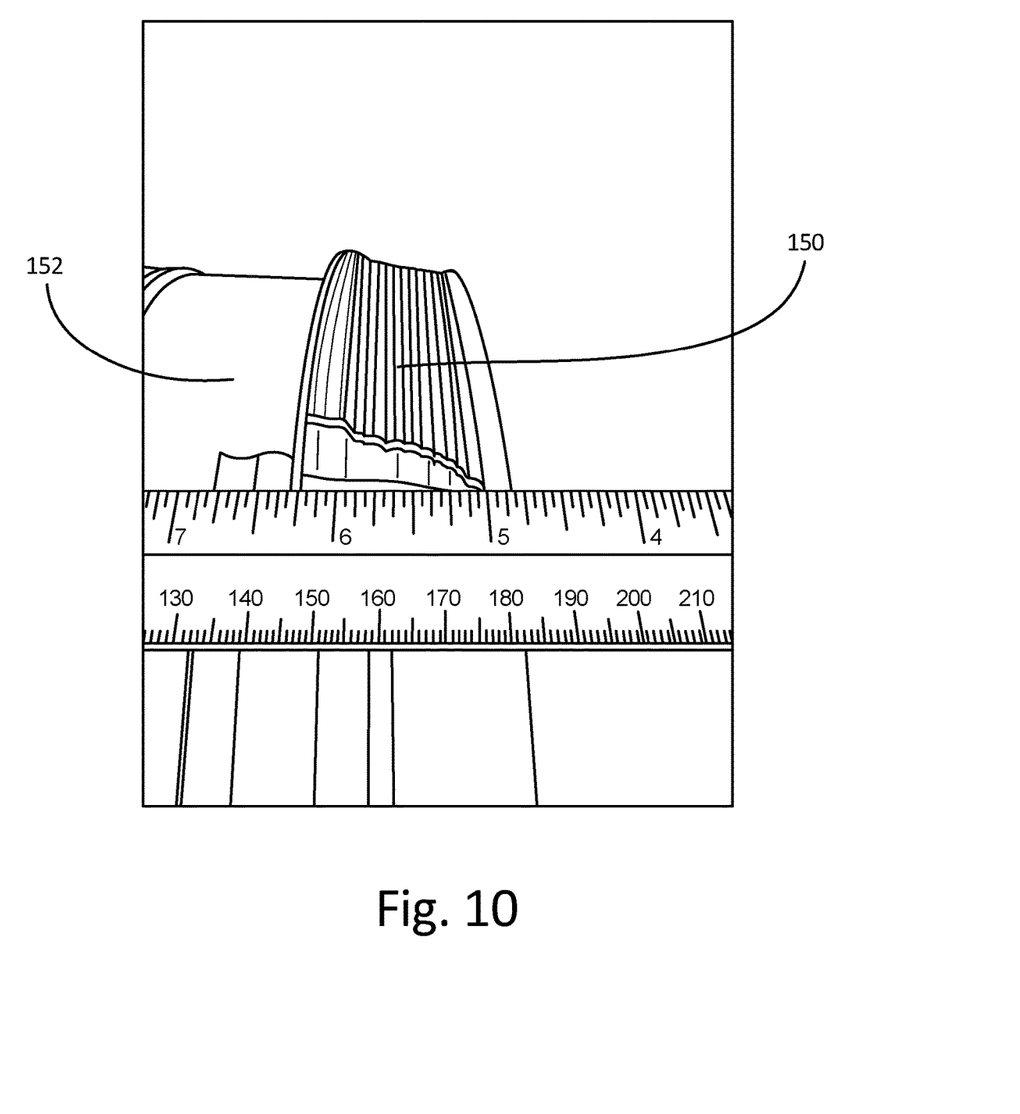
FIG. 10 is a diagrammatic illustration of a structural feature formed on a spinformed tank shell by wire feed laser deposition.

FIG. 10 is a diagrammatic illustration of structural feature 150 on spinformed metallic tank shell 152 formed by wire feed laser deposition. Both structural feature 130 and spinformed metallic tank shell 132 are CPTi. The feature is in the form of a ledge or shelf. Striations on the feature are due to the forming process and in practice, would be removed when the feature is machined to final dimensions.

DISCUSSION OF POSSIBLE EMBODIMENTS

The following are nonexclusive descriptions of possible embodiments of the present invention.

A method of forming metallic structural features in a specific region of a thin wall spinformed metallic tank shell may include: forming a thin wall metallic tank shell blank by spinforming a metal sheet over a mandrel; removing the tank shell blank from the mandrel; mounting the blank in an additive manufacturing system; and adding the metallic structural features to the tank shell according to a 3D model stored in memory in the additive manufacturing system.

The method of the preceding paragraph can optionally include, additionally and/or alternatively any, one or more of the following features, configurations and/or additional components:

The thickness of the metal sheet may be from about 0.125 in. (0.321 cm) to about 2.0 in. (5.08 cm).

The features may be added outside and inside of the metallic tank shell.

The features added to the outside of the tank shell may be at least one of ribs, bosses, brackets, and shelves.

The features added to the inside of the tank shell may be at least one of ribs, shelves, and mounting structures for propellant management devices (PMD).

The metallic structural features may be composed of one or more of aluminum, titanium, steel, and alloys thereof.

The structural features may be composed of one or more 6061, 2219, 2014 aluminum alloys, and CP Ti, Ti-6Al-4V, Ti-15V-3Cr-3Sn-3Al titanium alloys.

The additive manufacturing system may be configured to perform powder based and wire based direct metal deposition processes.

The powder based direct metal deposition may be at least one of laser engineered net shaping (LENS), direct metal laser sintering (DMLS), selected laser melting, laser powder injection, and direct metal deposition (DMD).

The wire based direct metal deposition may be at least one of wire feed laser deposition, electron beam additive manufacturing (EBAM), hot wire gas tungsten arc welding (HW-GTAW), and ion fusion formation (IFF).

A thin wall spinformed metallic tank shell may include: a first region with a first thickness; at least one second region with a second thickness greater than the first thickness including structural features formed by an additive manufacturing process.

The thin wall spinformed metallic tank shell of the preceding paragraph can optionally include, additionally and/or alternatively any, one or more of the following features, configurations, and/or additional components:

The structural features may be on the outside or inside of the tank shell.

The structural features on the outside of the tank shell may be at least one of ribs, bosses, brackets, and shelves.

The structural features on the inside of the tank shell may be at least one of ribs, shelves, and mounting structures for propellant management devices (PMD).

The structural features may be formed from a metal comprising one or more of aluminum, titanium, steel, and alloys thereof.

The metal may be 6061, 2219, 2014 aluminum alloys and CP Ti, Ti-6Al-4V, Ti-15V-3Cr-3Sn-3Al titanium alloys.

The additive manufacturing process may be a powder based and wire based direct metal deposition process.

The powder based direct metal deposition may include at least one of laser engineered net shaping (LENS), direct metal laser sintering (DMLS), selected laser melting, laser powder injection, and direct metal deposition (DMD).

The wire based direct metal deposition may include one of wire feed laser deposition, electron beam additive manufacturing (EBAM), hot wire gas tungsten arc welding (HW-GTAW), and ion fusion formation (IFF).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming metallic structural features in a specific region of a thin wall spinformed metallic tank shell, the method comprising:
    forming a thin wall metallic tank shell blank by spinforming a metal sheet over a mandrel;
    removing the tank shell blank from the mandrel;
    mounting the blank in an additive manufacturing system configured to perform powder based and wire based direct metal deposition processes; and
    adding the metallic structural features to the tank shell according to a 3D model stored in memory in the additive manufacturing system wherein the features are added outside and inside of the metallic tank shell and wherein the features added to the tank shell comprise at least one of:
    (a) polar bosses added to one or both external polar regions of a spherical section of the tank;
    (b) mounting tabs on a circumferential skirt of the tank;
    (c) mounting rings containing threaded holes attached to the interior or exterior surface of the tank;
    (d) mounting trunnions attached to the external surface of the tank;
    (e) propellant management features attached to the interior surface of the tank;
    (f) structural reinforcement vanes and ribs attached to the inside surface of the tank; and
    (g) brackets and/or shelves attached to the inside surface of the tank.

2. The method of claim 1, wherein the thickness of the metal sheet is from about 0.125 in. (0.318 cm) to about 0.5 in. (1.27 cm).

3. The method of claim 1, wherein the metallic structural features are composed of one or more of aluminum, titanium, steel, and alloys thereof.

4. The method of claim 3, wherein the structural features are composed of one or more of 6061, 2219, 2014 aluminum alloys and CP Ti, Ti-6Al-4V, Ti-15V-3Cr-3Sn-3Al titanium alloys.

5. The method of claim 1, wherein powder based direct metal deposition comprises at least one of laser engineered net shaping (LENS), direct metal laser sintering (DMLS), selected laser melting, laser powder injection, and direct metal deposition (DMD).

6. The method of claim 1, wherein wire based direct metal deposition comprises at least one of wire feed laser deposition, electron beam additive manufacturing (EBAM), hot wire gas tungsten arc welding (HW-GTAW), and ion fusion formation (IFF).

* * * * *